H. STROM.
HOSE CONNECTION.
APPLICATION FILED AUG. 21, 1907.
928,817.
Patented July 20, 1909.
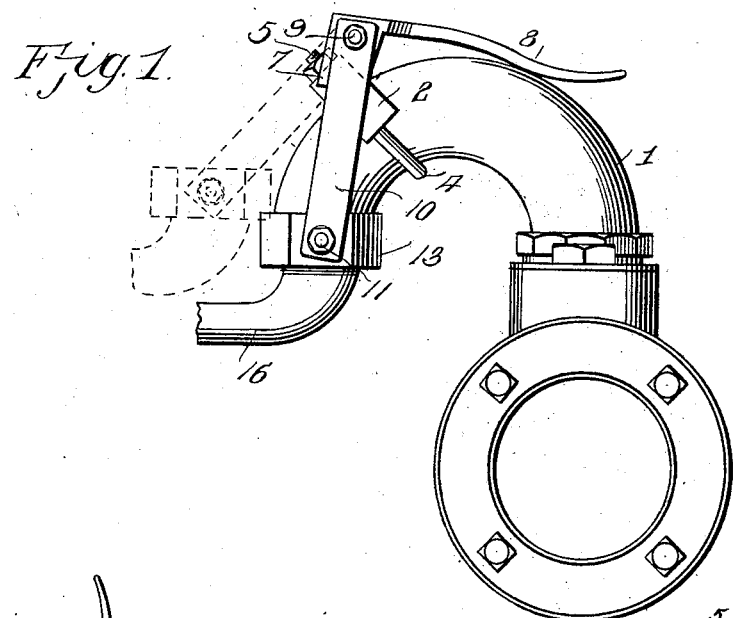
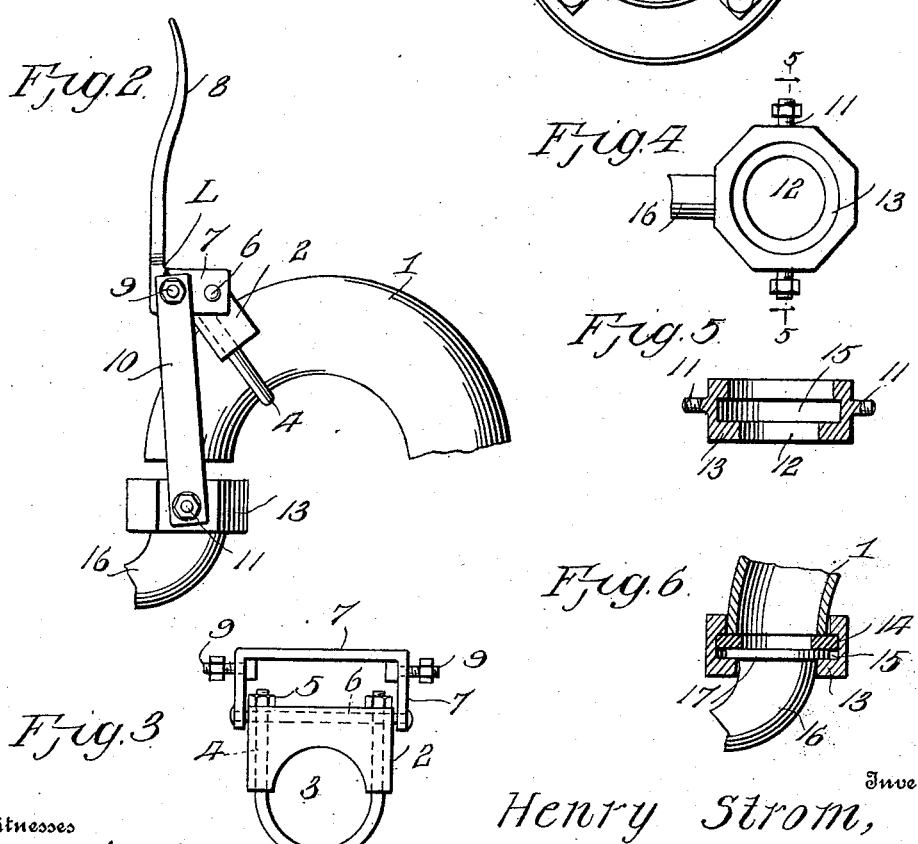
Witnesses
Frank Hough
Wm Bagger
Inventor
Henry Strom,
By Victor J. Evans
Attorney

UNITED STATES PATENT OFFICE.

HENRY STROM, OF HILLSBORO, NORTH DAKOTA.

HOSE CONNECTION.

No. 928,817.   Specification of Letters Patent.   Patented July 20, 1909.

Application filed August 21, 1907. Serial No. 389,572.

*To all whom it may concern:*

Be it known that I, HENRY STROM, a citizen of the United States, residing at Hillsboro, in the county of Traill and State of North Dakota, have invented new and useful Improvements in Hose Connections, of which the following is a specification.

This invention relates to an improved hose connection for connecting a hose pipe with the neck or discharge pipe of a pump; and it has for its object to provide a simple and efficient device, by means of which a hose may be quickly and efficiently connected with a discharge pipe or disconnected therefrom, as occasion may require.

With these and other ends in view which will readily appear as the nature of the invention is better understood, the same consists in the improved construction and novel arrangement and combination of parts which will be hereinafter fully described and particularly pointed out in the claim.

In the accompanying drawings has been illustrated a simple and preferred form of the invention; it being, however, understood that no limitation is necessarily made to the precise structural details therein exhibited, but that changes, alterations and modifications within the scope of the claim may be resorted to when desired.

In the drawing, Figure 1 is a side view showing a gooseneck or discharge pipe of a pump, equipped with the invention. Fig. 2 is a similar view showing the hose in the act of being connected or disconnected. Fig. 3 is a detail plan view of the block carrying the connecting lever. Fig. 4 is a detail plan view of the union. Fig. 5 is a vertical transverse sectional view of the union taken on the plane indicated by the line 5—5 in Fig. 4. Fig. 6 is a sectional view of the union taken at right angles to Fig. 5, and showing portions of the parts assembled thereby.

Corresponding parts in the several figures are denoted by like characters of reference.

The discharge pipe or pump neck in connection with which the invention is used may be an ordinary gooseneck, as will be seen at 1. The improved connection includes a block 2 having a recess or cavity 3 whereby it is fitted upon the upper side of the gooseneck 1, where it is secured by means of a U-shaped clip 4 placed astride the pipe 1, with its limbs extending through apertures 4 in the block, and provided with nuts 5 which may be tightened for the purpose of securing the block in position. The block 2 is provided with a transverse pin or bolt 6 affording bearings for the ears 7 of a bell-crank lever L having a handle 8 whereby it may be conveniently manipulated. The ears 7 of the lever L are provided with pins or trunnions 9 which are suitably spaced from the pivotal pin or bolt 6 and which are connected by means of links 10 with trunnions 11 extending laterally from a union 12 on diametrically opposite sides of the latter. The union 12 consists of a sleeve or collar having an annular flange 13 adapted to support an elastic gasket or washer 14 for the accommodation of which the sleeve or collar is provided with an undercut annular recess 15 which enables said gasket or washer to be held securely in position without danger of being accidentally displaced.

From the foregoing description taken in connection with the drawings hereto annexed, the operation and advantages of this invention will be readily understood. The metal connection 16, which is extended into the sleeve or collar constituting the union, is provided with an annular flange 17 engaging the flange 13 of the union. The hose may be suitably attached to the connection 16. To effect the connection, the block 2 is adjusted upon the discharge pipe 1 as clearly seen in Figs. 1 and 2, and the union is placed in engagement with the end of the discharge pipe where it is firmly secured by proper manipulation of the bell-crank lever; disconnection may be effected by moving the lever in the opposite direction, as will be very readily understood.

Having thus fully described the invention, what is claimed as new is:—

In combination with pipe sections and a union for coupling the same, a block having a recess in one face forming a seat to receive one of the pipe sections and having openings at each side of the recess, a U-shaped clip embracing the pipe section seated in said block and having its members passed through the openings of the block, nuts threaded upon the projecting ends of said members for clamping the block and clip upon the pipe section, a bell crank lever comprising a handle member and a head having spaced ears embracing opposite ends of said block, a pin passed through said block and the ears of the bell crank lever, and links embracing opposite sides of the union and bell crank lever and pivotally connected to each.

In testimony whereof I affix my signature in presence of two witnesses.

HENRY STROM.

Witnesses:
TOM S. FARR,
GUST AUKREED.